(12) United States Patent
Kita et al.

(10) Patent No.: US 7,554,716 B2
(45) Date of Patent: Jun. 30, 2009

(54) INFORMATION DISPLAY PANEL

(75) Inventors: Shinichi Kita, Saitama (JP); Hajime Tamura, Kawasaki (JP); Takanori Shoji, Higashimurayama (JP); Hirotaka Yamazaki, Kunitachi (JP)

(73) Assignee: Bridgestone Corporation, Tokyo (JP)

( * ) Notice: Subject to any disclaimer, the term of this patent is extended or adjusted under 35 U.S.C. 154(b) by 124 days.

(21) Appl. No.: 11/594,871

(22) Filed: Nov. 9, 2006

(65) Prior Publication Data

US 2007/0120815 A1    May 31, 2007

(30) Foreign Application Priority Data

| Nov. 9, 2005 | (JP) | ............................. 2005-324994 |
| Nov. 21, 2005 | (JP) | ............................. 2005-335409 |
| Nov. 6, 2006 | (JP) | ............................. 2006-300646 |
| Nov. 6, 2006 | (JP) | ............................. 2006-300682 |

(51) Int. Cl.
G02B 26/00    (2006.01)

(52) U.S. Cl. ........................................ 359/296; 359/290

(58) Field of Classification Search .................. 359/296, 359/290, 238; 345/107
See application file for complete search history.

(56) References Cited

U.S. PATENT DOCUMENTS 6,271,823 B1 *    8/2001    Gordon et al. .............. 345/107

(Continued)

FOREIGN PATENT DOCUMENTS

EP    1482354 A1    12/2004

(Continued)

*Primary Examiner*—Timothy J Thompson
(74) *Attorney, Agent, or Firm*—Sughrue Mion, PLLC

(57) ABSTRACT

In a first aspect of the invention, an information display panel, in which at least one group of display media having optical reflectance and charge characteristics, formed by at least one group of particles, are scaled in a cell (corresponding to one display unit) formed by partition walls between two substrates, at least one substrate being transparent, and, in which the display media, to which an electrostatic field is applied, are made to move so as to display information such as an image, includes (1) a color filter formed by arranging filters having a predetermined numbers of colors on a transparent substrate at a display side so as to perform a color display, and a black layer arranged between the partition walls and the transparent substrate. In a second and a third aspects of the invention, an information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as a color image, includes (2) transparent color filters having three primary colors respectively arranged to one cell, and a colorless transparent clear portion arranged to the respective transparent color filters, and (3) transparent color filters having three primary colors respectively arranged to three pixels formed by dividing respective display units by means of partition walls, and a colorless transparent clear portion arranged to the respective transparent color filters.

19 Claims, 15 Drawing Sheets

U.S. PATENT DOCUMENTS

| | | |
|---|---|---|
| 6,310,672 B1 | 10/2001 | Koike et al. |
| 6,885,495 B2 * | 4/2005 | Liang et al. ................. 359/296 |
| 2002/0008898 A1 * | 1/2002 | Katase ....................... 359/296 |
| 2003/0214567 A1 | 11/2003 | Kanazawa et al. |
| 2006/0209388 A1 * | 9/2006 | Whitesides et al. ......... 359/296 |
| 2007/0030422 A1 * | 2/2007 | Ikeno et al. ................. 349/106 |
| 2007/0091043 A1 * | 4/2007 | Rho et al. .................... 345/88 |

FOREIGN PATENT DOCUMENTS

| | | |
|---|---|---|
| JP | 2004145204 A | 5/2004 |
| JP | 2004279572 A | 10/2004 |

* cited by examiner

FIG. 6
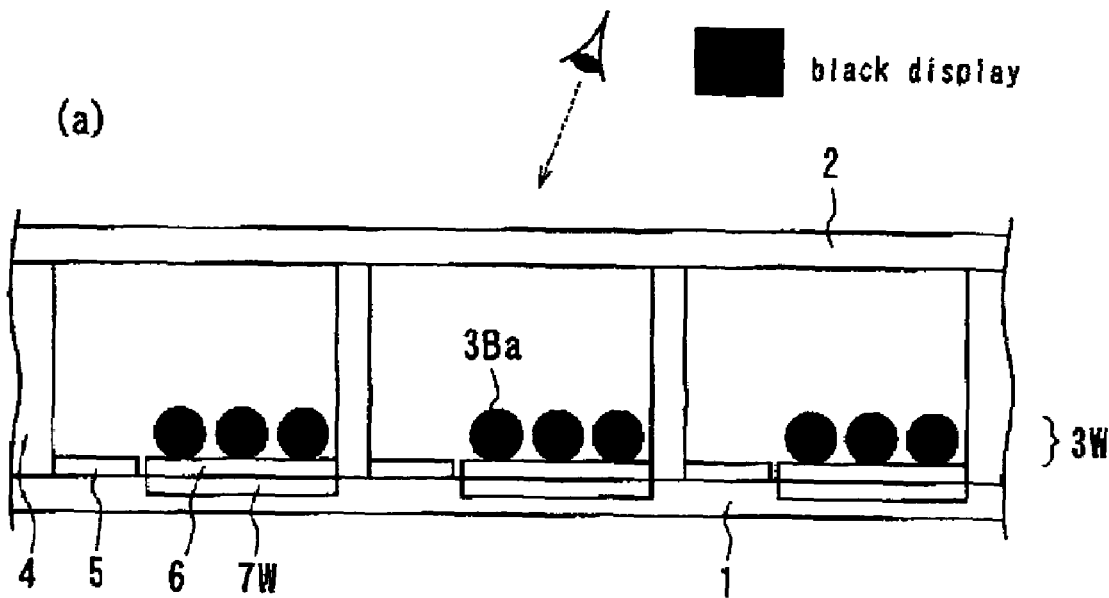
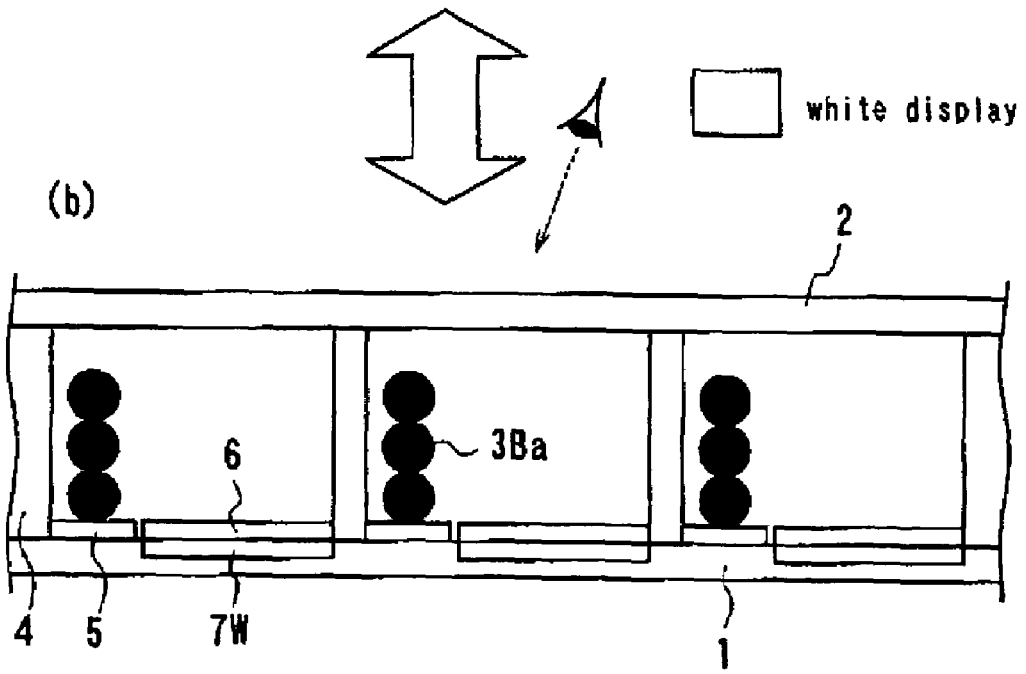

FIG. 10
(a)
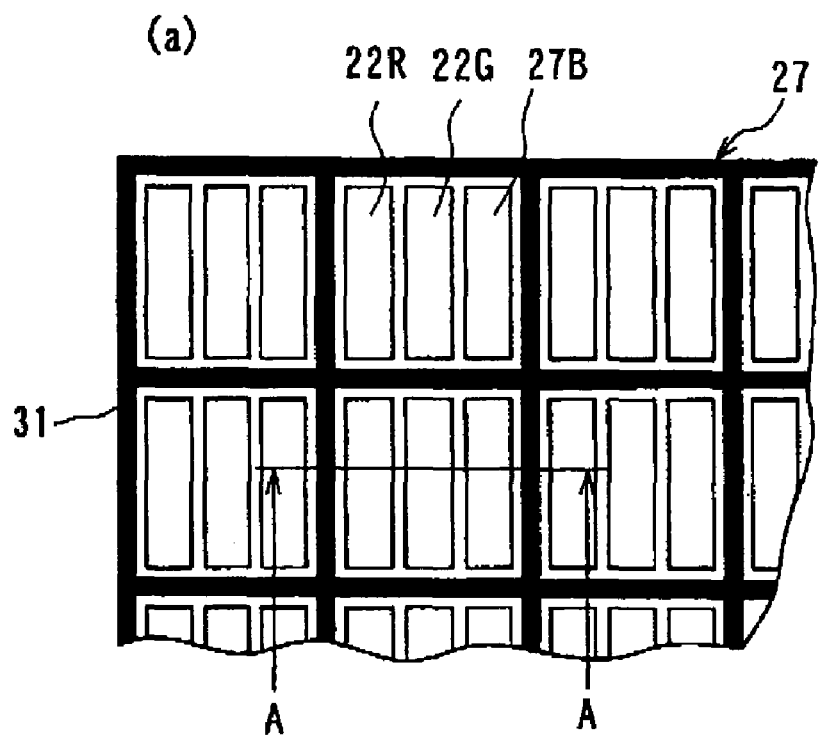
(b)
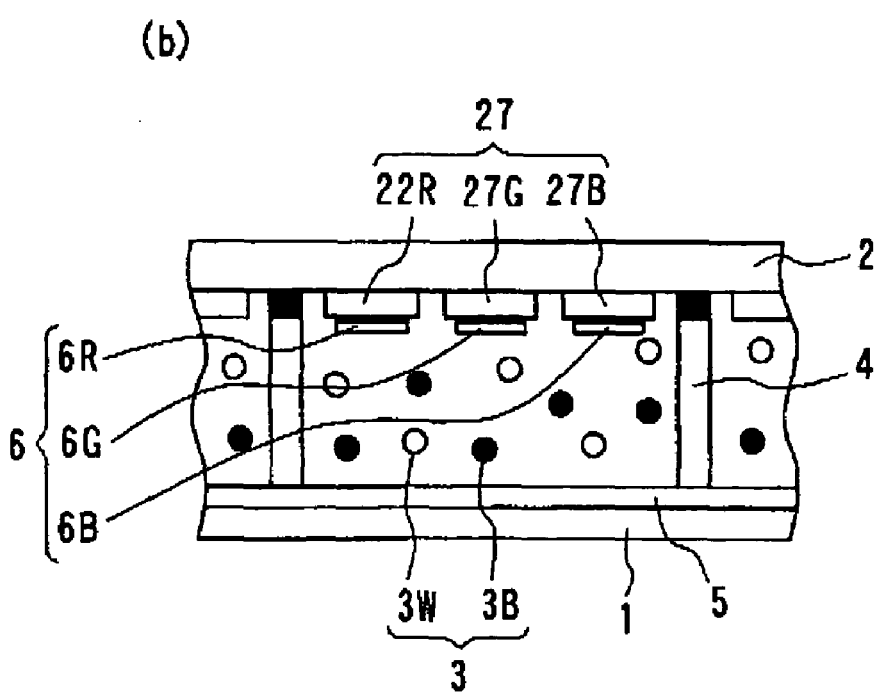

INFORMATION DISPLAY PANEL

BACKGROUND OF THE INVENTION

1. Field of the Invention

The present invention relates to an information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as an image.

Moreover, the present invention relates to an information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as a color image.

2. Description of Related Art

As an information display device substitutable for liquid crystal display (LCD), information display devices with the use of technology such as an electrophoresis method, an electro-chromic method, a thermal method, dichroic-particles-rotary method are proposed.

As for these information display devices, it is conceivable as inexpensive visual display device of the next generation from a merit having wide field of vision close to normal printed matter, having smaller consumption with LCD, or having a memory function, and spreading out to a display for portable device and an electronic paper is expected. Recently, electrophoresis method is proposed that microencapsulate dispersion liquid made up with dispersion particles and coloration solution and dispose the liquid between faced substrates, and also it is expected.

However, in the electrophoresis method, there is a problem that a response rate is slow by the reason of viscosity resistance because the particles migrate among the electrophoresis solution. Further, there is a problem of lacking imaging repetition stability, because particles with high specific gravity of titanium oxide is scattered within solution of low specific gravity, it is easy to subside, difficult to maintain a stability of dispersion state. Even in the case of microencapsulating, cell size is diminished to a microcapsule level in order to make it hard to appear, however, an essential problem was not overcome at all.

Besides the electrophoresis method using behavior in the solution, recently, a method wherein electro-conductive particles and a charge transport layer are installed in a part of the substrate without using solution is proposed. [The Imaging Society of Japan "Japan Hardcopy '99" (Jul. 21-23, 1999) Transaction Pages 249-252] However, the structure becomes complicated because the charge transport layer and further a charge generation layer are to be arranged. In addition, it is difficult to constantly dissipate charges from the electro-conductive particles, and thus there is a drawback on the lack of stability.

As one method for overcoming the various problems mentioned above, an information display panel is known, in which at least one or more groups of display media having optical reflectance and charge characteristic, which are constituted by at least one of more groups of particles, are sealed between opposed two substrates, at least one substrate being transparent, and, in which the display media, to which an electrostatic field is applied, are made to move so as to display information such as an image.

In the known information display panel mentioned above, in order to perform a color display, it is thought about that use is made of for example white color and black color display media and a color filter formed by aligning filters having a predetermined number of Colors. For example, a color filter 51 formed by normally well-using red (R), green (G) and blue (B) filters constructs one display unit 52 by means of a red filter 51R, a green filter 51G and a blue filter 51B as shown in FIG. 19 as one example. Moreover, in order to improve a contrast of display color, a black matrix 53 having a black color is formed between respective filters. Therefore, in the known color filter 51 having the construction mentioned above, it is necessary to perform the process for forming the black matrix 53 between respective filters, and thus there are drawbacks such that a manufacturing process becomes complicated and a cost becomes high.

Moreover, as the another known examples of the information display panel in which a color display of information such as an image is performed, as shown in FIG. 20, there is known the information display panel, in which white color and black color display media (particles or liquid powders) 101W, 1010B are sealed in an air space of a cell 105 between a transparent substrate 103 at a display side, to which transparent color filters having three primary colors 102R, 102G, 102B are provided respectively and a substrate 104, and, in which the display media are moved to perform a color display of information such as an image (for example, referred to a pamphlet of International Publication WO2004/008239).

In the known information display panel mentioned above, in the case of using the white particles and the black particles as the display media, the color display is performed in such a manner that a reflection light from the white particles or the black particles is transmitted through the transparent color filters 102R, 102G, 102B and the transmitted lights are synthesized, and a colored layer 107 is arranged between a top of a partition wall 106 constituting one pixel and the substrate 103 and also between a partition wall 108 constituting respective cells 105 and the substrate 103. Therefore, it is possible to make a black density higher, but there is a drawback such that a display condition of a panel display surface becomes dark due to absorption of the transparent color filters.

SUMMARY OF THE INVENTION

An object of a first aspect of the invention is to eliminate the drawbacks mentioned above and to provide an information display panel in which, even in the case of performing a color display by using a color filter, a manufacturing process can be made easy and a cost can be reduced.

An object of second and third aspects of the invention is to eliminate the drawbacks mentioned above and to provide an information display panel in which a brightness of a display condition on a panel display surface can be improved.

According to a first aspect of the invention, an information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as an image, comprises a color filter formed by arranging filters having a predetermined numbers of colors on a transparent substrate at a display side so as to perform a color display, and a black layer arranged between the partition walls and the transparent substrate.

As a preferred embodiment of the information display panel according to the first aspect of the invention, there is a case: such that the color filter is constructed by aligning the filters having three primary colors respectively, and one display unit is constructed by one color filter having three primary colors; such that the color filter is constructed by aligning the filters having three primary colors respectively, and one display unit is constructed by one color filter having three primary colors and a transparent filter; such that, as the filter having three primary colors, use is made of red (R), green (G) and blue (B) filters; such that, as the filter having three primary colors, use is made of cyan (C), magenta (M) and yellow (Y) filters; and such that the at least one group of display media having optical reflectance and charge characteristics, formed by at least one group of particles are two groups of display media such as white color display media and black color display media.

According to the first aspect of the invention, since a color filter is formed by arranging filters having a predetermined numbers of colors on a transparent substrate at a display side so as to perform a color display, and a black layer is arranged between the partition walls and the transparent substrate, a color display can be possible and a black color layer surrounding respective pixels can be viewed by a naked eye during the color display, so that it is possible to obtain the same effects as those of the known black matrix. Since the black color layer can be formed in a stacked manner simultaneously when the partition walls are formed, it is possible to obtain the information display panel, in which a manufacturing process can be made easy and a cost can be reduced.

Moreover, according to a second aspect of the invention, an information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as a color image, comprises transparent color filters having three primary colors respectively arranged to one cell, and a colorless transparent clear portion arranged to the respective transparent color filters.

Further, according to a third aspect of the invention, an information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as a color image, comprises transparent color filters having three primary colors respectively arranged to three pixels formed by dividing respective display units by means of partition walls, and a colorless transparent clear portion arranged to the respective transparent color filters.

As a preferred embodiment of the information display panel according to the second aspect or the third aspect of the invention, there is a case: such that the clear portion is formed by one of hole, slit, crossed line, line stripe and circular stripe; such that a width of the clear portion is 0.1%-200% of an average particle diameter of the particles constituting the display media; and such that a sum of areas of the clear portions Sk is $0.01<Sk/S<0.8$ with respect to a total area S of the display region.

According to the second aspect and the third aspect of the invention, since the transparent color filters having three primary colors are provided to the cell constituting respective display unit and the colorless transparent clear portion is arranged to respective transparent color filters, it is possible to obtain the information display panel in which a brightness of the display condition on the panel display surface can be improved.

BRIEF DESCRIPTION OF THE DRAWINGS

FIGS. 6a and 6b are schematic views respectively depicting still another embodiment of the information display panel according to the invention;

FIGS. 10a and 10b are schematic views respectively showing one embodiment of the information display panel according to the first aspect of the invention;

DESCRIPTION OF THE PREFERRED EMBODIMENT

Figure 1:
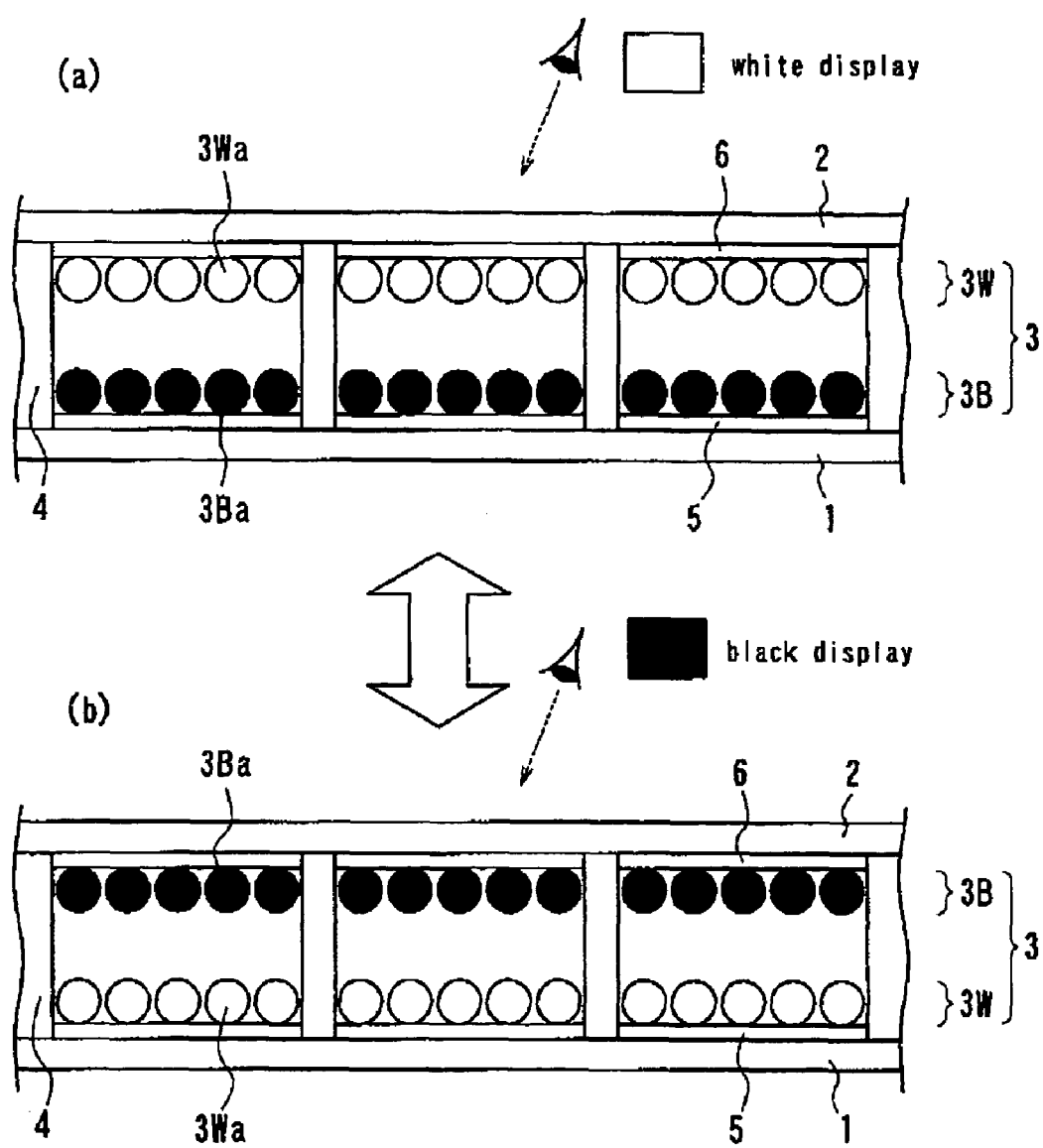
FIGS. 1a and 1b are schematic views respectively showing one embodiment of the information display panel according to the invention.
Figure 2:
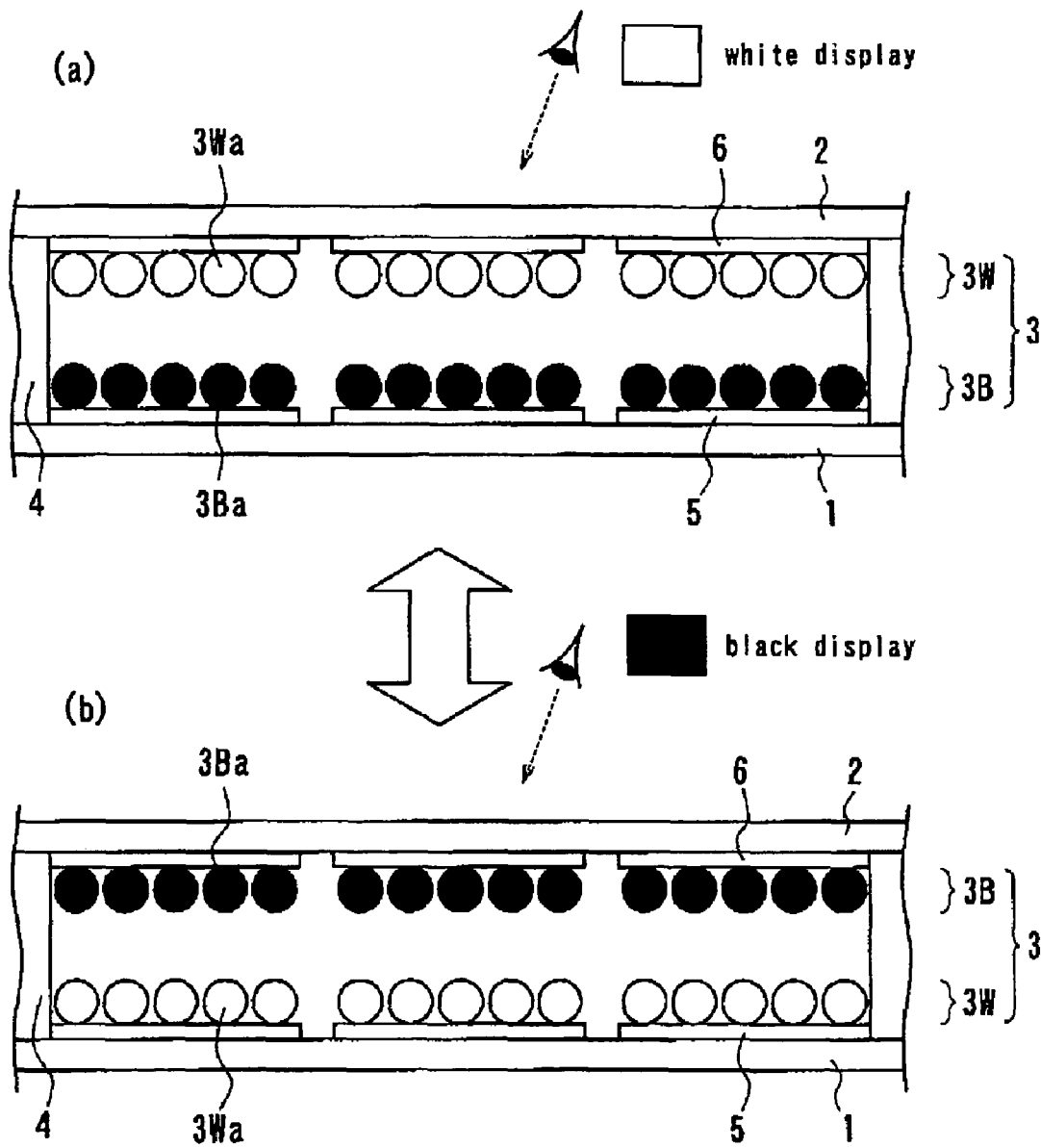
FIGS. 2a and 2b are schematic views respectively illustrating another embodiment of the information display panel according to the invention.
Figure 3:
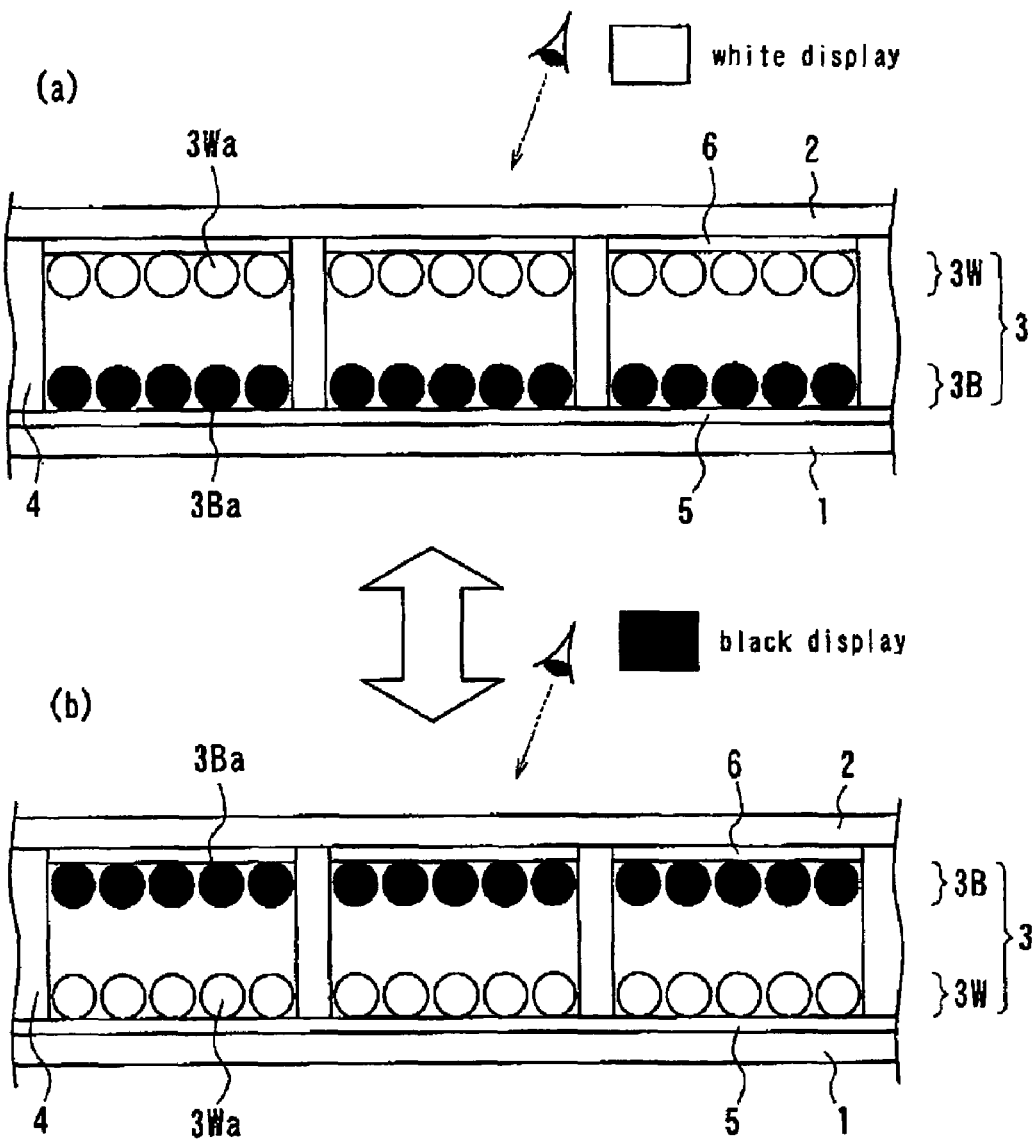
FIGS. 3a and 3b are schematic views respectively depicting still another embodiment of the information display panel according to the invention.
Figure 4:
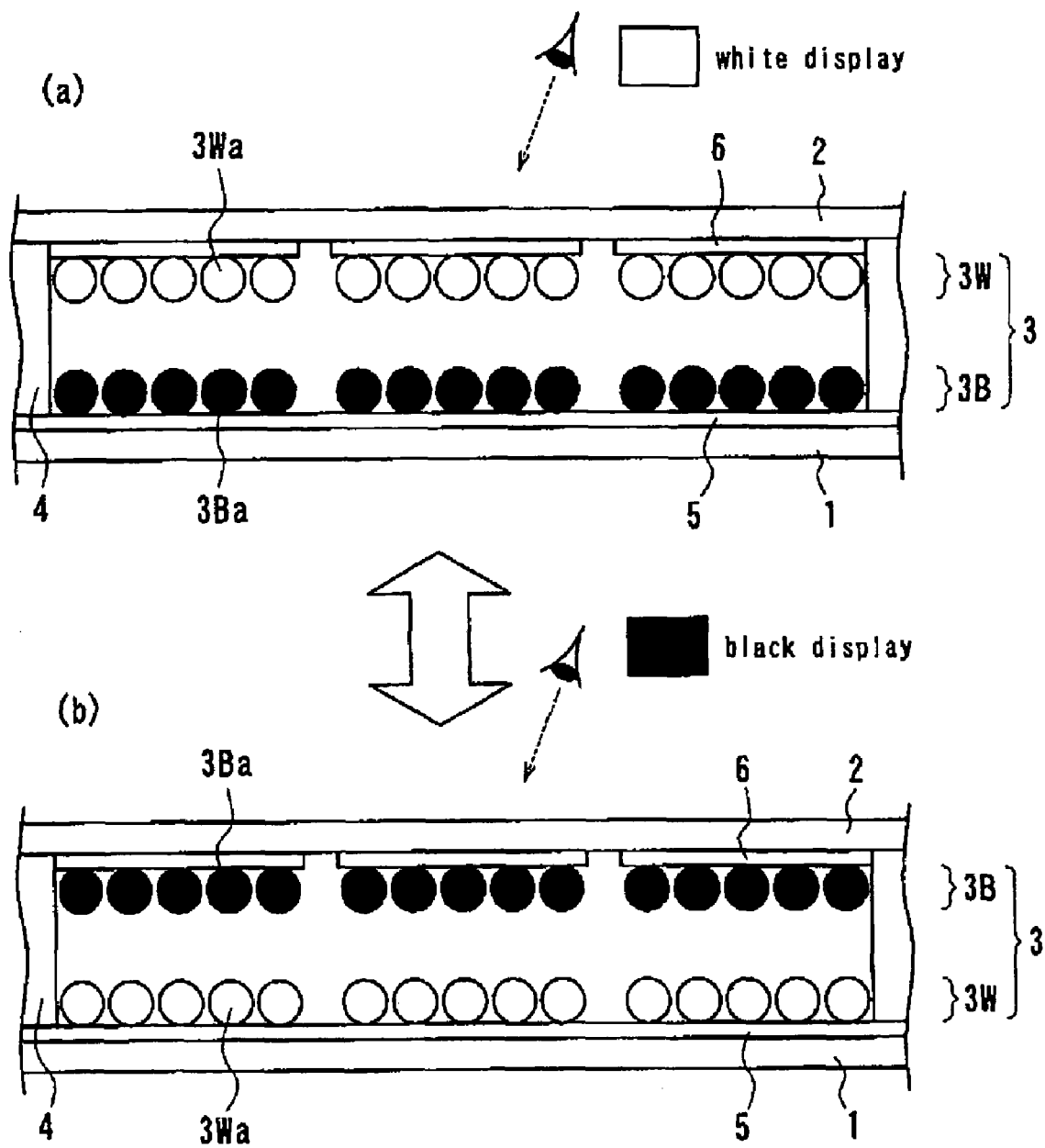
FIGS. 4a and 4b are schematic views respectively showing still another embodiment of the information display panel according to the invention.
Figure 5:
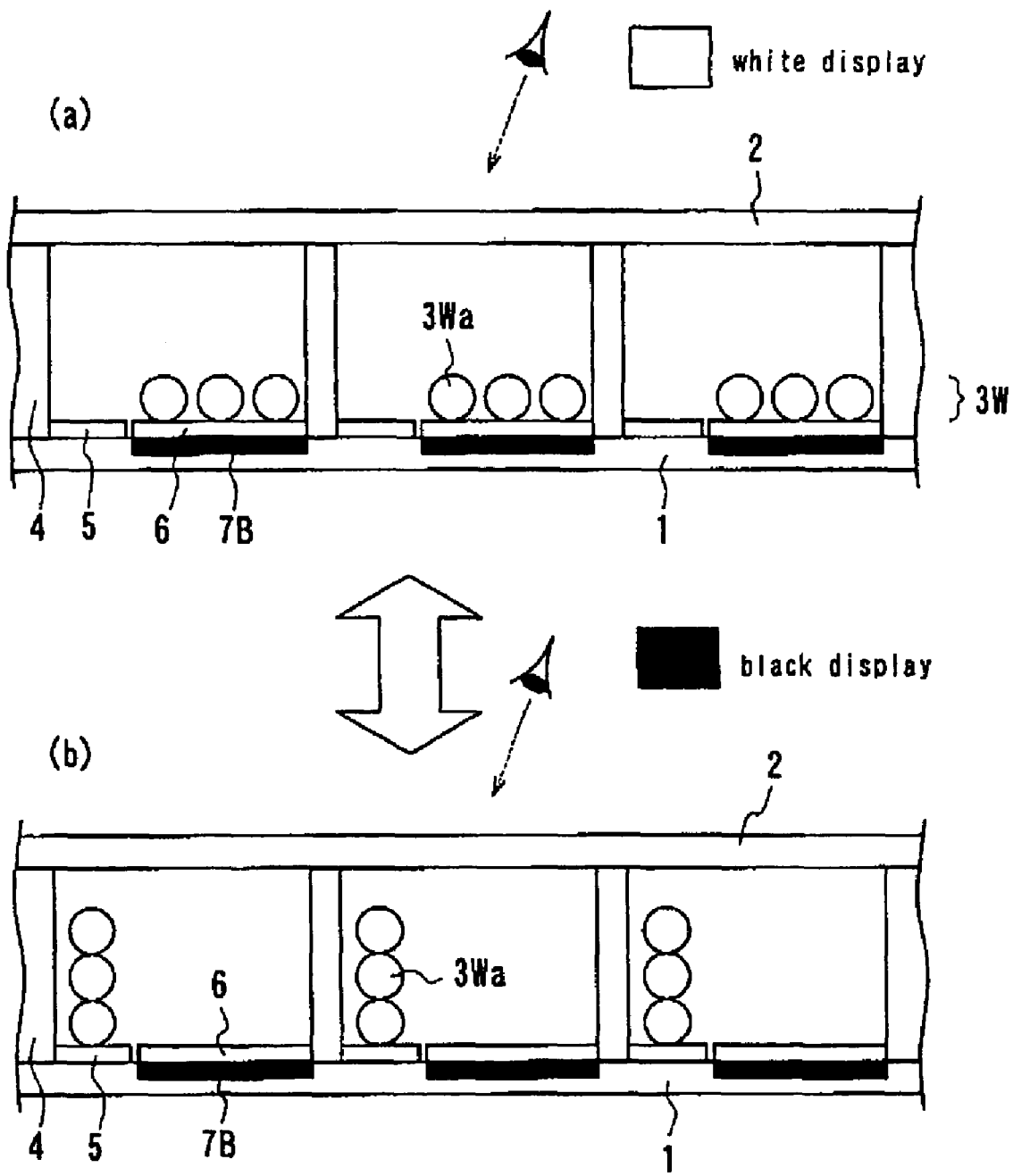
FIGS. 5a and 5b are schematic views respectively illustrating still another embodiment of the information display panel according to the invention.
Figure 7:
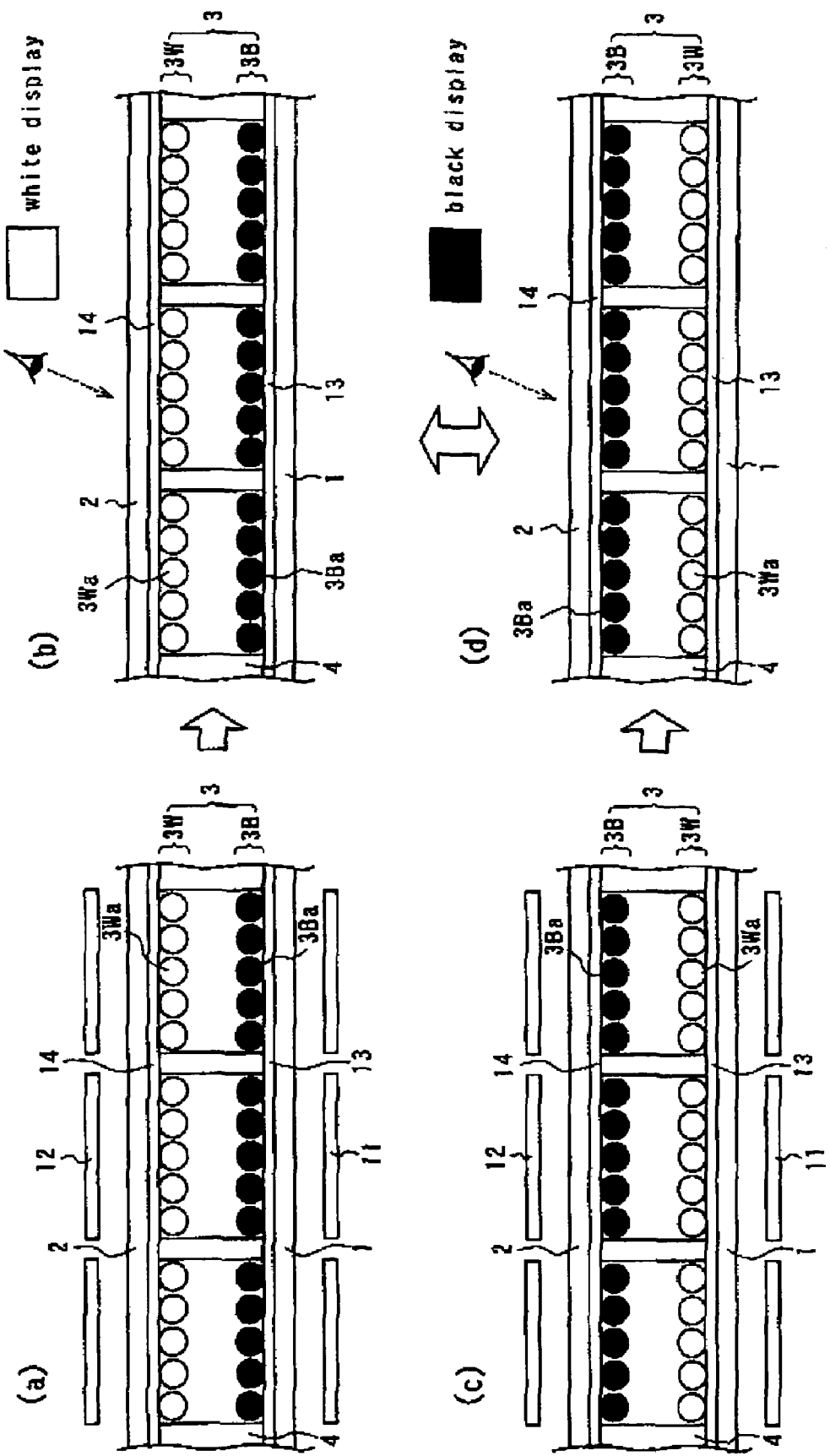
FIGS. 7a-7d are schematic views respectively showing still another embodiment of the information display panel according to the invention.

At first, a basic construction of an information display panel according to the present invention will be explained. In the information display panel used in the present invention, an electrostatic field is applied to display media sealed in the space between two opposed substrates. Along a direction of the applied electrostatic field by means of the force of the electrostatic field, Coulomb's force or the like, the charged display media are attracted and moved by varying a direction of electrostatic field. Accordingly, information such as an image or the like can be displayed. Therefore, it is necessary to design the information display panel in such a manner that the display media can move evenly and maintain stability during a reciprocal operation or during a reserving state. Here, as to forces applied to the particles constituting display media, there are an attraction force between the particles due to Coulomb' force, an imaging force with respect to the electrodes or substrates, an intermolecular force, a liquid bonding force, a gravity and the like.

A basic constitution of the information display panel of the invention will be explained with reference to FIGS. 1a and 1b-FIG. 9.

In the examples shown in FIGS. 1a and 1b, at least two or more groups of display media 3 having different optical reflectance and charging characteristics and consisting of at least one or more groups of particles (here, a white particle 3W consisting of particles for white display media 3Wa and a black particle 3B consisting of particles for black display media 3Ba are shown) are moved in each cell formed by partition walls perpendicularly with respect to substrates 1 and 2, in accordance with an electric field applied between an electrode (discrete electrode) 5 arranged on the substrate 1 and an electrode (discrete electrode) 6 arranged on the substrate 2. A white color is displayed by viewing the white particle 3W to an observer as shown in FIG. 1a or a black color is displayed by viewing the black particle 3B to the observer as shown in FIG. 1b. In FIGS. 1a and 1b, the partition wall arranged at a near side is omitted. The electrode may be provided outside the substrate or inside the substrate in a manner that the electrode is embedded in the substrate. If a color filter is provided in the examples, three cells shown in the figures and each RGB filter are combined to constitute one display unit and each cell has each corresponding color filter.

In the examples shown in FIGS. 2a and 2b, partition walls are removed from the examples shown in FIGS. 1a and 1b. If a color filter is provided in the examples, partition walls form a cell with respect to one display unit constituted in combination with color filters.

In the examples shown in FIGS. 3a and 3b, at least two or more groups of display media 3 having different optical reflectance and charging characteristics and consisting of at least one or more groups of particles (here, a white particle 3W consisting of particles for white display media 3Wa and a black particle 3B consisting of particles for black display media 3Ba are shown) are moved in each cell formed by partition walls perpendicularly with respect to substrates 1 and 2, in accordance with an electric field applied between an electrode (line electrode) 5 arranged on the substrate 1 and an electrode (line electrode) 6 arranged on the substrate 2. A white color is displayed by viewing the white particle 3W to an observer as shown in FIG. 3a or a black color is displayed by viewing the black particle 3B to the observer as shown in FIG. 3b. In FIGS. 3a and 3b, the partition wall arranged at a near side is omitted. The electrode may be provided outside the substrate or inside the substrate in a manner that the electrode is embedded in the substrate. If a color filter is provided in the examples, three cells shown in the figures and each RGB filter are combined to constitute one display unit and each cell has each corresponding color filter.

In the examples shown in FIGS. 4a and 4b, partition walls are removed from the examples shown in FIGS. 3a and 3b. If a color filter is provided in the examples, partition walls form a cell with respect to one display unit constituted in combination with color filters.

In the examples shown in FIGS. 5a and 5b, display media 3 having optical reflectance and charging characteristics and consisting of at least one or more groups of particles (here, a white particle 3W consisting of particles for white display media 3Wa are shown) are moved in each cell formed by partition walls parallel with respect to substrates 1 and 2, in accordance with an electric field applied between an electrodes 5 and 6 arranged on the substrate 1. A white color is displayed by viewing the white particle 3W to an observer as shown in FIG. 5a or a black color is displayed by viewing a black plate 27B to the observer as shown in FIG. 5b. In FIGS. 5a and 5b, the partition wall arranged at a near side is omitted. The electrode may be provided outside the substrate or inside the substrate in a manner that the electrode is embedded in the substrate. If a color filter is provided in the examples, three cells shown in the figures and each RGB filter are combined to constitute one display unit and each cell has each corresponding color filter.

In the examples shown in FIGS. 6a and 6b, black display media 3B are used instead of white display media 3W and a white plate 7W is used instead of the black plate 27B so that similar display can be obtained.

In the examples shown in FIGS. 7a to 7d, as shown in FIGS. 7a and 7c at least two or more groups of display media 3 having different optical reflectance and charging characteristics and consisting of at least one or more groups of particles (here, a white particle 3W consisting of particles for white display media 3Wa and a black particle 3B consisting of particles for black display media 3Ba are shown) are moved in each cell formed by partition walls perpendicularly with respect to substrates 1 and 2, in accordance with an electric field applied between an external electrical field forming means 11 arranged outside the substrate 1 and an external electrical field forming means 12 arranged outside the substrate 2. A white color is displayed by viewing the white particle 3W to an observer as shown in FIG. 7b or a black color is displayed by viewing the black particle 3B to the observer as shown in FIG. 7d. In FIGS. 7a to 7d, the partition wall arranged at a near side is omitted. In addition, a conductive member 13 is arranged inside the substrate 1 and a conductive member 14 is arranged inside the substrate 2. These conductive members may not be arranged. If a color filter is provided in the examples, three cells shown in the figures and each RGB filter are combined to constitute one display unit and each cell has each corresponding color filter.

The above explanations can be applied to a case such that the white particles 3W consisting of particles are substituted by white display media consisting of white liquid powders or a case such that the black particles 3B consisting of particles are substituted by black display media consisting of black liquid powders.

Figure 8:
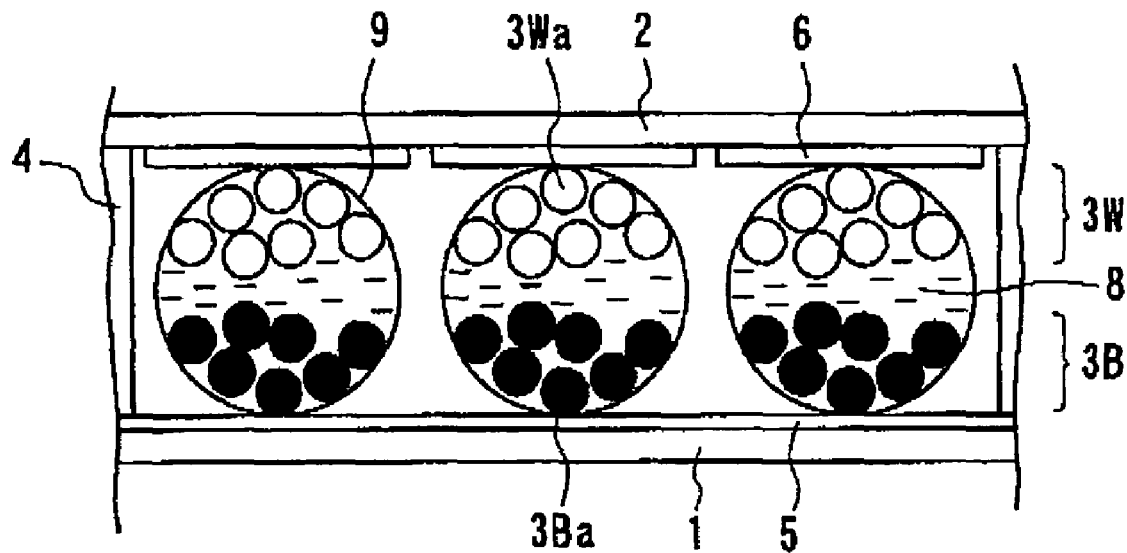
FIG. 8 is a schematic view illustrating still another embodiment of the information display panel according to the invention.
Figure 9:
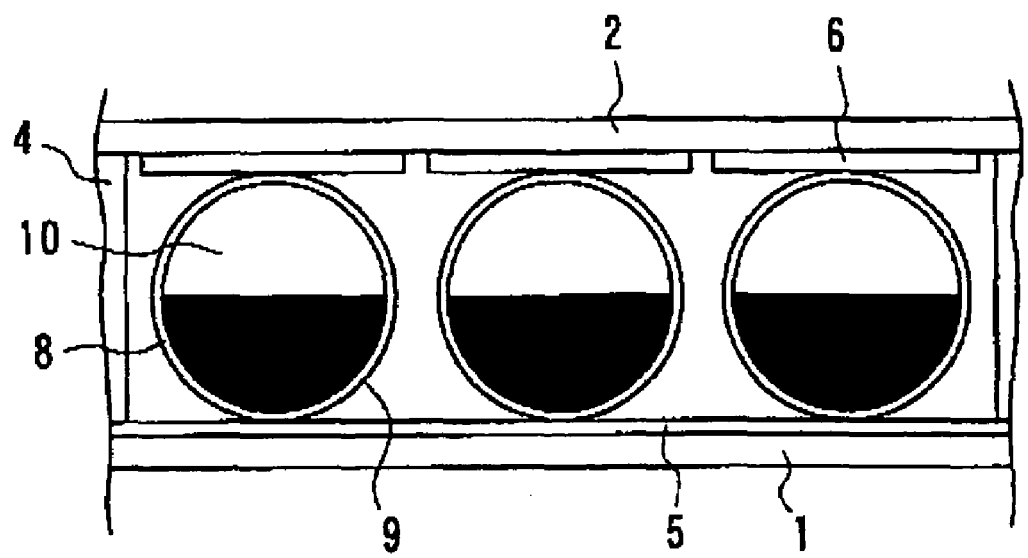
FIG. 9 is a schematic view depicting still another embodiment of the information display panel according to the invention.

In the examples shown in FIGS. 8 and 9, another examples to display white and black by using line electrodes 5 and 6 as similar to the examples shown in FIGS. 4a and 4b are explained. In the example shown in FIG. 8, a microcapsule 9 filled with white display media 3W, black display media 3B and insulating liquid 8 is used instead of a cell filled with white display media 3W and black display media 3B, formed by partition walls shown in FIGS. 4a and 4b. In the example shown in FIG. 9, a microcapsule 9 filled with insulating liquid 8 and a rotating ball 10, which is painted white and black with reverse polarity in halves, as display media is used instead of a cell filled with white display media 3W and black display media 3B, formed by partition walls shown in FIGS. 4a and 4b. In both examples shown in FIGS. 8 and 9, as similar to the example shown in FIG. 4b, white and black display can be achieved. If a color filter is provided in the examples, partition walls form a cell with respect to one display unit constituted in combination with three microcapsules and RGB color filters.

<Explanation of First Aspect of the Invention>

In the information display panel having the construction mentioned above, features of the first aspect of the invention are that a color filter is formed by arranging filters having a predetermined numbers of colors on a transparent substrate at a display side so as to perform a color display, and a black layer is arranged between the partition walls and the transparent substrate. Hereinafter, practical examples will be explained.

FIGS. 10a and 10b are schematic views respectively showing a construction of one embodiment of the information display panel according to the first aspect of the invention, and FIG. 10b illustrates a cross sectional view along A-A line in FIG. 10a. In the embodiment shown in FIGS. 10a and 10b, portions similar to those of FIGS. 1a, 1b-FIG. 9 are denoted by the same reference numerals as those of FIGS. 1a, 1b-FIG. 9, and the explanations thereof are omitted here. In the embodiment shown in FIGS. 10a and 10b, different points from the embodiments shown in FIGS. 1a, 1b-FIG. 9 are that the electrode 6 at the display side is constituted by electrodes 6R, 6G, 6B corresponding to red, green, blue, and, that a display for one display unit is performed by one cell. In this case, it is preferred that a width of the color filter is at least larger than the electrode width and that a width between adjacent color filters is larger than an average diameter of the particles for display media and the color filters are not overlapped. If the width of the color filter is not larger than the electrode width, color purity becomes deteriorated. Moreover, if the overlapped width of the color filters is larger an average particle diameter of the particles for display media, brightness becomes decreased.

In this embodiment, in addition to the construction mentioned above, a planar color filter 27 constituted by aligning red, green, blue filters 27R, 27G, 27B through a transparent layer is arranged inside of the transparent substrate 2 at the display side, and a black color layer 31 is arranged between the partition wall 4 and the transparent substrate 2 at the display side. Then, one display unit is constructed by one group of the red, green, blue filters 27R, 27G, 27B. In this case, one group of the red, green, blue filters 27R, 27G, 27B may be substituted by one group of cyan, magenta, yellow filters.

Therefore, in this embodiment, a predetermined color display can be performed in such a manner that respective colors are viewed through the color filter 27 by moving the white color display media 3W to the transparent electrodes 6R, 6G, 6B at the display side respectively. Moreover, a black color frame surrounding the cell constituting one display unit can be viewed by viewing the black color layer 31 arranged between the partition wall 4 and the transparent substrate 2 through the transparent portion of the color filter 27, and thus the same effects as those of the known black matrix can be obtained. As a result, it is possible to maintain a contrast of display color preferably.

In the embodiment mentioned above, the color filter 27 is arranged inside of the substrate 2, but the present invention is not limited to this embodiment. Moreover, in the embodiment mentioned above, the electrodes 5 and 6 are directly exposed, but a transparent protection layer may be arranged on a surface of the color filter 27. Further, in the embodiment mentioned above, the electrodes 5 and 6 are arranged at most inner portion, but the color filter 27 may be arranged at most inner portion. In this case, a transparent protection layer may be arranged on the color filter 27. Furthermore, in the embodiment mentioned above, a color construction of the color filter 27 is red, green, blue or cyan, magenta, yellow, but the present invention is not limited to those embodiments.

Figure 11:
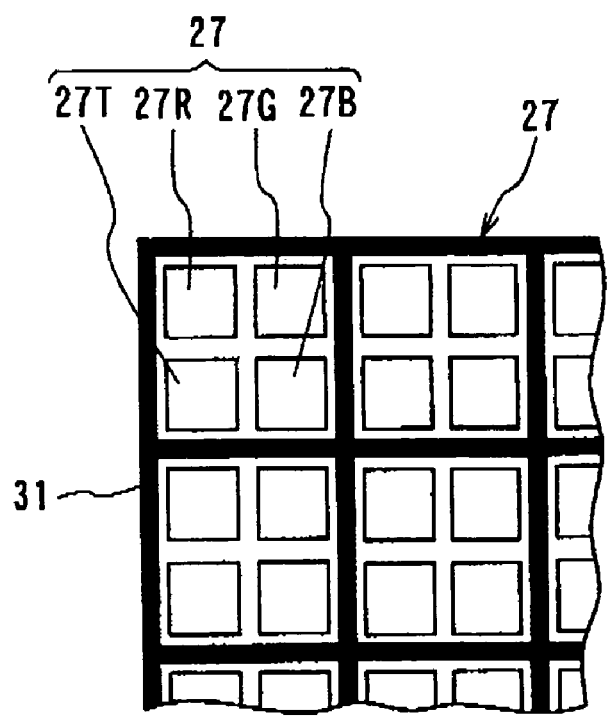
FIG. 11 is a schematic view illustrating one embodiment of the color filter used in the information display panel according to the first aspect of the invention.
Figure 12:
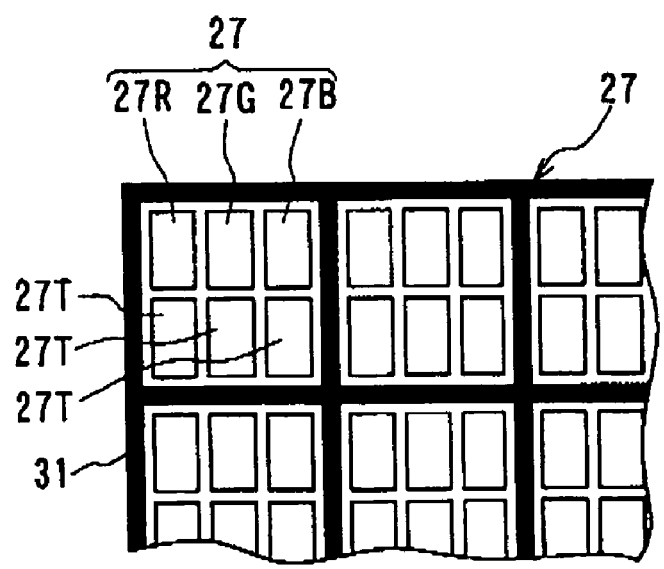
FIG. 12 is a schematic view depicting another embodiment of the color filter used in the information display panel according to the first aspect of the invention.

FIG. 11 and FIG. 12 are schematic views respectively explaining another embodiment of the information display panel according to the first aspect of the invention. In the embodiments shown in FIG. 11 and FIG. 12, portions similar to those of FIGS. 10a and 10b are denoted by the same reference numerals shown in FIGS. 10a and 10b, and the explanations thereof are omitted here. In the embodiments shown in FIG. 11 and FIG. 12, a different point from the embodiment shown in FIGS. 10a and 10b is that as the filter constituting one display unit a transparent filter 27T is arranged. In this case, an arrangement of the red, green, blue filters 27R, 27G, 27B and the transparent filter 27T is not limited to the embodiments shown in FIG. 11 and FIG. 12.

That is, in the embodiment shown in FIG. 11, one transparent filter 27T is aligned through a transparent layer in addition to the red, green, blue filters 27R, 27G, 27B to form the color filter 27, and one display unit is constructed by one group of the red, green, blue filters 27R, 27G, 27B and one transparent filter 27T. Moreover, in the embodiment shown in FIG. 12, three transparent filters 27T are aligned through a transparent layer in addition to the red, green, blue filters 27R, 27G, 27B to form the color filter 27, and one display unit is constructed by one group of the red, green, blue filters 27R, 27G, 27B and three transparent filters 27T. In this case, the red, green, blue filters 27R, 27G, 27B may be substituted by cyan, magenta, yellow filters.

In the case that the transparent filter 27 is arranged to form the filter constituting one display unit as shown in FIG. 11 and FIG. 12, if a display is performed by moving the white color display media 3W to this portion i.e. the transparent filter 27, a brightness of color display may be improved. Since brightness is increased according to an increase of the number of the transparent filters 27T, the example shown in FIG. 12 is brighter than the example shown in FIG. 11 if compared with the example shown in FIG. 11 and the example shown in FIG. 12. This feature is effective for solving the problem such that brightness is difficult to be made higher as is known especially in the information display panel that is the object of the invention, in which the display media are sealed in the cell (corresponding to one display unit) formed by the partition walls between two substrates, at least one substrate being transparent, and, in which the display media, to which an electrostatic filed is applied, are made to move so as to display information such as an image.

Figure 13:
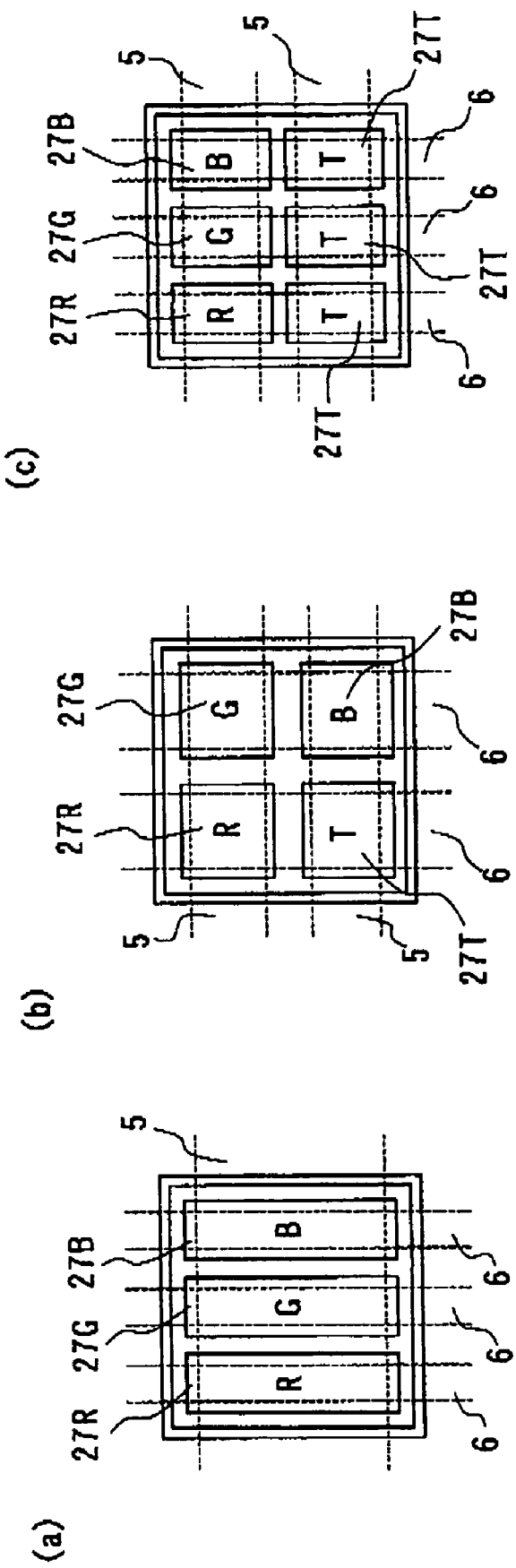
FIGS. 13a-13c are schematic views respectively showing a relation between the color filter and the electrode in the information display panel according to the first aspect of the invention.

FIGS. 13a-13c are schematic views respectively showing a relation between the color filter and the electrode in the information display panel according to the invention. In the embodiment shown in FIG. 13a, three upper ITO electrodes 6 are arranged in a longitudinal direction corresponding to one group of the red, green, blue filters 27R, 27G, 27B, and one lower ITO electrode 5 is arranged in a lateral direction. In the embodiment shown in FIG. 13b, two upper ITO electrodes 6 are arranged in a longitudinal direction and two lower ITO electrodes 5 are arranged in a lateral direction, corresponding to four filters arranged in 2×2 matrix manner made of one group of the red, green, blue filters 27R, 27G, 27B and one transparent filter 27T. In the embodiment shown in FIG. 13c, three upper ITO electrodes 6 are arranged in a longitudinal direction and two lower ITO electrodes 5 are arranged in a lateral direction, corresponding to six filters arranged in 2×3 matrix manner made of one group of the red, green, blue filters 27R, 27G, 27B and three transparent filters 27T.

<Explanations of Second Aspect and Third Aspect of the Invention>

In the information display panel having the construction mentioned above, features of the second aspect of the invention are that a color filter is formed by arranging filters having a predetermined numbers of colors on a transparent substrate at a display side so as to perform a color display, and a black layer is arranged between the partition walls and the transparent substrate. Moreover, in the image display panel having the construction mentioned above, features of the third aspect of the invention are that transparent color filters having three primary colors respectively are ranged to three pixels formed by dividing respective display units by means of partition walls, and a colorless transparent clear portion is arranged to the respective transparent color filters. Hereinafter, practical examples will be explained.

Figure 14:
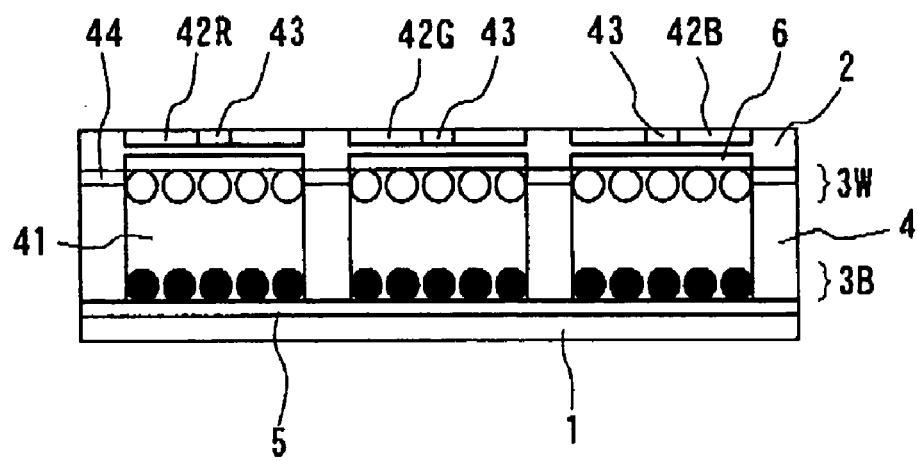
FIG. 14 is a schematic view illustrating one embodiment of the information display panel according to the third aspect of the invention.

FIG. 14 is a schematic view explaining one embodiment of the information display panel according to the third aspect of the invention. In the embodiment shown in FIG. 14, it is shown the embodiment in which one display unit is constructed by three pixels 41 formed by the partition walls 4 respectively. In this embodiment, transparent color filters 42R, 42G, 42B constituting three primary colors are arranged to the three pixels 41 respectively, in such a manner that the transparent color filters 42R, 42G, 42B are arranged to the transparent substrate 2 at the display side respectively corresponding to the electrodes 6. In this embodiment, an electrostatic field is generated by applying a voltage between the electrodes 5 and 6, and the display media 3W, 3B are moved in response to the thus generated electrostatic field so as to perform a color display. In this case, a numeral 44 is a colored layer arranged between a top of the partition wall 4 and the substrate 2. Moreover, in the case of a color display, a display unit is constructed by the cell in which the color filters having three primary colors are provided respectively to three pixels, and the display media are moved independently in respective pixels constituting the display unit, so that a color display can be performed by synthesizing three primary colors obtained through the color filters.

Figure 15:
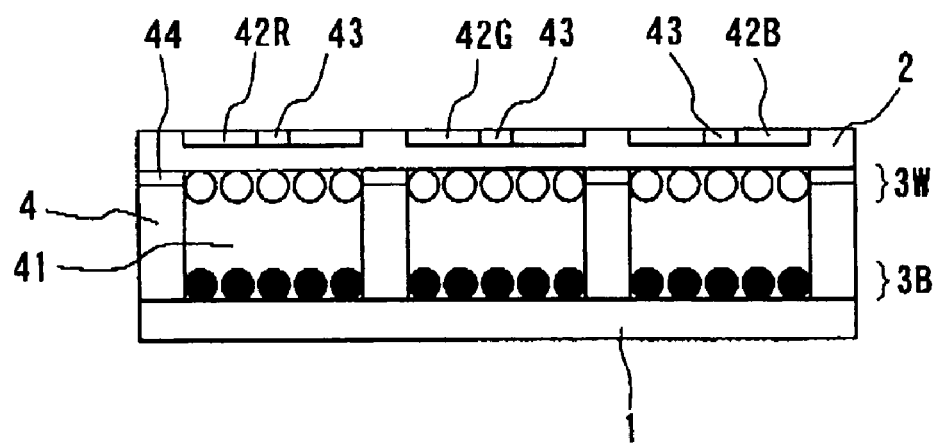
FIG. 15 is a schematic view depicting another embodiment of the information display panel according to the third aspect of the invention.

FIG. 15 is a schematic view explaining another embodiment of the information display panel according to the third aspect of the invention. In the embodiment shown in FIG. 15, it is shown the embodiment in which one display unit is constructed by three pixels 41 formed by the partition walls 4 respectively, and the transparent color filters 42R, 42G, 42B constituting three primary colors are arranged to the three pixels 41 respectively. In this embodiment, an electrostatic field is applied outside of the panel, and the display media 3W, 3B are moved in response to the thus applied electrostatic field so as to perform a color display. In this case, a numeral 44 is a colored layer arranged between a top of the partition wall 4 and the substrate 2.

Figure 16:
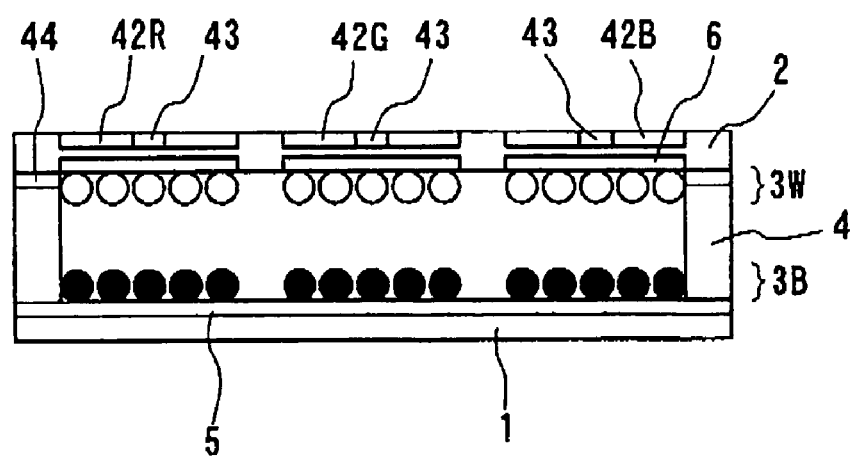
FIG. 16 is a schematic view showing one embodiment of the information display panel according to the second aspect of the invention.

FIG. 16 is a schematic view explaining one embodiment of the information display panel according to the second aspect of the invention. In the embodiment shown in FIG. 16, the partition walls 4 (partition walls at both ends in FIG. 14) remain as they are as shown in FIG. 14, and the partition wall between the transparent color filters 42R and 42G and the partition wall between the transparent color filters 24G and 42B (center two partition walls other than the partition walls at both ends in FIG. 14) are removed from the construction shown in FIG. 14. Also in this embodiment, the present invention can be preferably performed.

In the embodiments shown in FIG. 14-FIG. 16, most important features of the second and third aspects of the invention are that a colorless transparent clear portion 43 is arranged to the transparent color filters 42R, 42G, 42B respectively. In this manner, since the colorless transparent clear portion 43 is arranged to the transparent color filters 42R, 42G, 42B respectively, even in the information display panel according to the invention in which a color display is performed by a reflected light, it is possible to reduce an absorption due to the color filters and to make a display condition of the panel display surface bright while maintaining a color purity, as compared with the known embodiment in which overall surfaces of the panel are covered with the color filters. The colorless transparent portion 43 in the color filters is formed, in such a manner that a cut-out portion corresponding to the colorless transparent clear portion is formed in the color filters, and then (1) a colorless transparent protection layer is arranged to an overall surface of the color filters, or, (2) a colorless transparent clear portion is arranged directly to the cut-out portion. In this case, it is preferred that a width of the color filter is at least larger than the display electrode width, and also it is preferred that a width between adjacent color filters is larger than an average diameter of the particles for display media and the color filters are not overlapped. If the width of the color filter is not larger than the display electrode width, color purity becomes deteriorated. Moreover, if the overlapped width of the color filters is larger an average particle diameter of the particles for display media, brightness becomes decreased.

FIGS. 17a-17i are schematic views respectively explaining one embodiment of the clear portion of the color filters in the information display panel according to the second and third aspects of the invention. In the embodiments shown in FIGS. 17a-17i, it is shown an example of the clear portion 43 arranged to one group of the transparent color filters 42R, 42G, 42B constituting one display unit.

Figure 17:
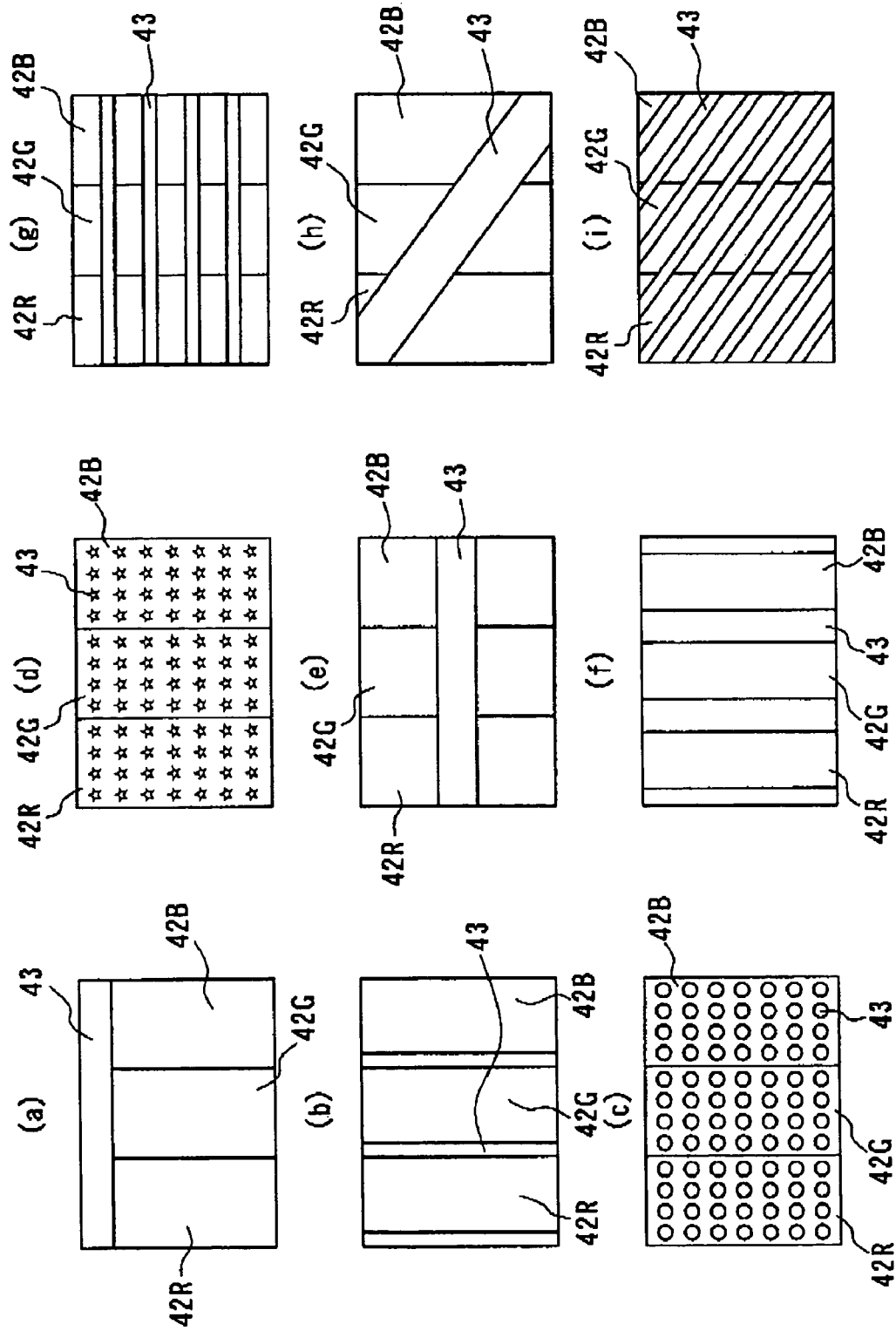
FIGS. 17a-17i are schematic views respectively explaining one embodiment of the clear portion of the color filter in the information display panel according to the second and third aspects of the invention.

In the embodiment shown in FIG. 17a, the clear portion 43 having a slit shape is arranged in a lateral direction on an upper portion bridging over the transparent color filters 42R, 42G and 42B. In the embodiment shown in FIG. 17b, the clear portion 43 having a slit shape is arranged in a longitudinal direction between adjacent transparent color filters 42R and 42G, or, 42G and 42B, or 42B and 42R respectively. In the embodiment shown in FIG. 17c, a plurality of clear portions 43 each made of a circular hole arranged equidistantly with each other are arranged to the transparent color filters 42R, 42G, 42B respectively. In this case, a shape of the hole may be changed to a circular shape having a smaller diameter, a tetragonal shape, a triangular shape and so on. In the embodiment shown in FIG. 17d, a plurality of clear portions 43 each made of a star-shaped hole arranged equidistantly with each other are arranged to the transparent Color filters 42R, 42G, 42B respectively.

In the embodiment shown in FIG. 17e, the clear portion 43 having a slit shape is arranged in a lateral direction on a center portion bridging over the transparent color filters 42R, 42G and 42B. In the embodiment shown in FIG. 17f, the clear portion 43 having a slit shape similar to that of FIG. 17b, whose width is larger than that of FIG. 17n, is arranged in a longitudinal direction between adjacent transparent color filters 42R and 42G, or, 42G and 42B, or, 42B and 42R respectively. In the embodiment shown in FIG. 17g, a plurality of clear portions 43 each having a slit shape are arranged in a lateral direction on portions bridging over the transparent color filters 42R, 42G and 42B. In the embodiment shown in FIG. 17h, the clear portion 43 having a line shape is arranged in such a manner that it crosses across the transparent color filters 42R, 42G, 42B from a left-upper portion to a right-lower portion. In the embodiment shown in FIG. 17i, a plurality of clear portions 43 each having a linen shape are arranged in such a manner that they cross across the transparent color filters 42R, 42G, 42B from a left-upper portion to a right-lower portion.

In the information display panel according to the invention, it is preferred that a width of the clear portion 43 is 0.1%-200% of an average particle diameter of the particles constituting the display media. Here, if the width of the clear portion 43 is less than 0.1% of an average particle diameter of the particles constituting the display media, brightness is not improved. If the width of the clear portion 43 exceeds 200% of an average particle diameter of the particles constituting the display media, color purity is decreased. Moreover, it is preferred that a sum of areas of the clear portions Sk is $0.01 < Sk/S < 0.8$ with respect to a total area S of the display region. Here, if Sk/S is smaller than 0.01, brightness is not improved, and, if Sk/S is larger than 0.8, color purity is decreased.

Moreover, in the information display panel according to the invention, the partition walls 4 may be a continued one, which form the cell (corresponding to one display unit) or the pixel completely surrounded by them, or may be a discontinued one, which form the cell incompletely surrounded by them. In this case, the partition walls 4 need to have a function for maintaining a gap between the substrates at a predetermined size and a function for preventing an uneven distribution of the display media. Moreover, as shown in FIG. 16, inner two partition walls for forming three pixels by dividing the cell constituting one display unit. In addition, the partition walls arranged inside of the cell constituting one display unit may be the partition walls having a height shorter than a gap between the substrates.

Hereinafter, respective members constituting the information display panel according to the first aspect to the third aspect of the invention will be explained.

As for the substrate, at least one of the substrates is the transparent substrate 2 through which a color of the display media 3 can be observed from outside of the information display panel, and it is preferred to use a material having a high transmission factor of visible light and an excellent heat resistance. The substrate 1 may be transparent or opaque. Examples of the substrate material include polymer sheets such as polyethylene terephthalate, polyethylene naphthalate, polyether sulfone, polyethylene, polycarbonate, polyimide or acryl and metal sheets having flexibility and inorganic sheets such as glass, quartz or the like having no flexibility. The thickness of the substrate is preferably 2 to 5000 μm, more preferably 5 to 2000 μm. When the thickness is too thin, it becomes difficult to maintain strength and distance uniformity between the substrates, and when the thickness is thicker than 5000 μm, it is inconvenient for the thin information display panel.

As for materials for forming the electrodes or conductive members provided if necessary, metals such as aluminum, silver, nickel, copper, gold and so on, conductive metal oxides such as indium tin oxide (ITO), antimony tin oxide (ATO), indium oxide, conductive tin oxide and conductive zinc oxide and so on, and conductive polymer such as polyaniline, polypyrrole, polythiophene and so on are listed and appropriately used. As the method for forming the electrode, the pattern forming method in which a thin film is formed from the above-listed materials by sputtering method, vacuum vapor deposition method, CVD (chemical vapor deposition) method, and coating method, or the pattern forming method in which the mixed solution of an conductive agent with a solvent or a synthetic resin binder is applied, are used. The electrode or conductive member disposed on the substrate at the observation side (display side) should be transparent but the electrode or conductive member disposed on the back substrate may not be transparent. In both cases, above-mentioned conductive material capable of pattern forming can be preferably used. Additionally, the thickness of the electrode or conductive member is preferable to be 3 to 1000 nm, more preferable to be 5 to 400 nm so that the electro-conductivity and optical transparency can be maintained. The material and the thickness of the electrode arranged on the back substrate are similar to those of the electrode or conductive member arranged at the display side, but transparency is not necessary. In this case, the applied outer voltage may be superimposed with a direct current or an alternate current.

As for the partition wall 4 provided, a shape of the partition wall is suitably designed in accordance with a kind of the display media used for the display, a shape of disposed electrodes and a disposition and is not restricted. It is preferred to set a width of the partition wall to 2-100 μm more preferably 3-50 μm and to set a height of the partition wall to 10-100 μm more preferably 10-50 μm.

Moreover, there are a double rib method and single rib method as a method of forming the partition wall on the opposed substrates 1 and 2. In the double rib method ribs are formed on the opposed substrates respectively and then connected with each other. In the single rib method a rib is formed on one of the opposed substrates only. Both methods mentioned above may be preferably applied to the present invention.

Figure 18:
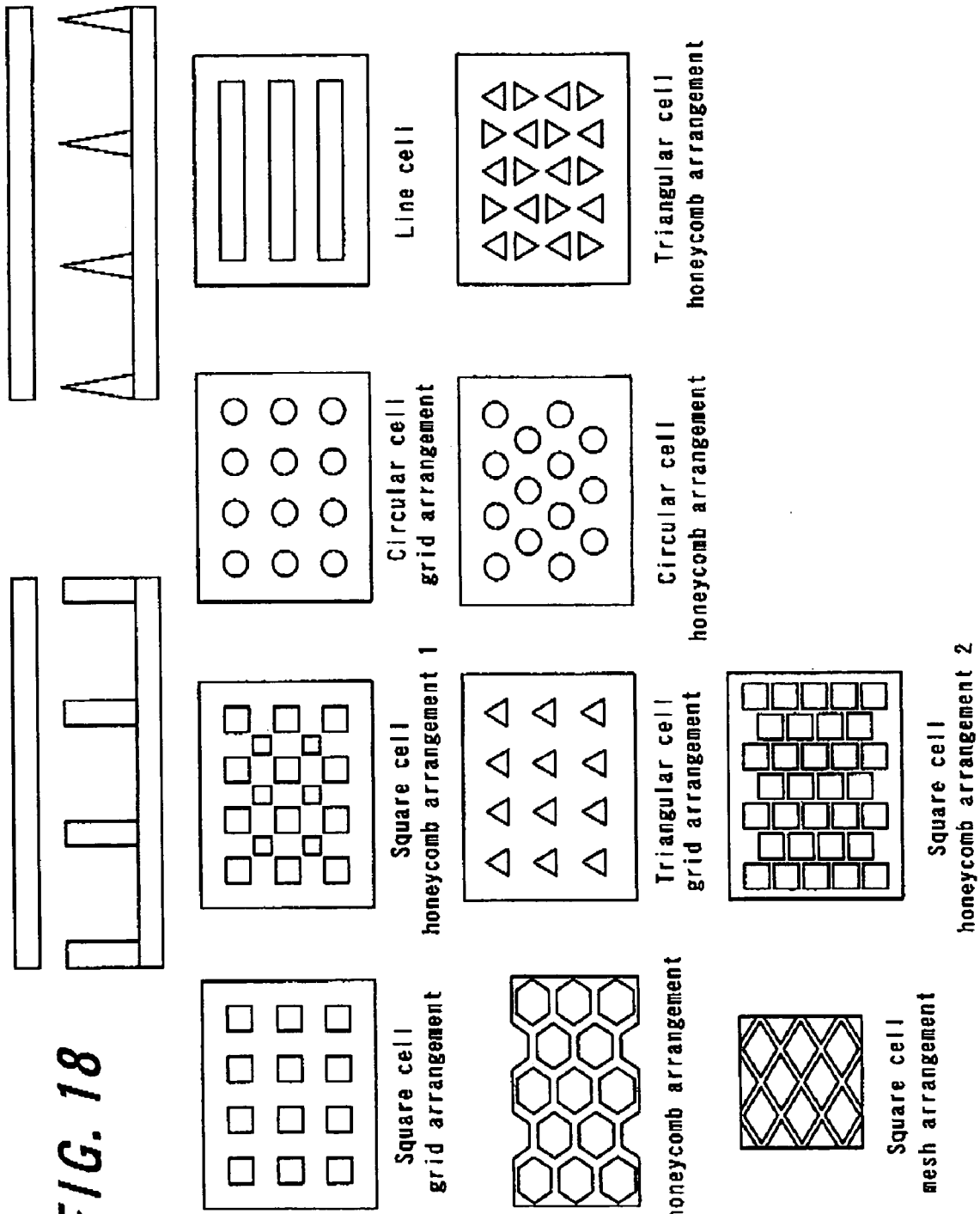
FIG. 18 is a schematic view illustrating one embodiment of a shape of the partition walls in the information display panel according the invention.
Figure 19:
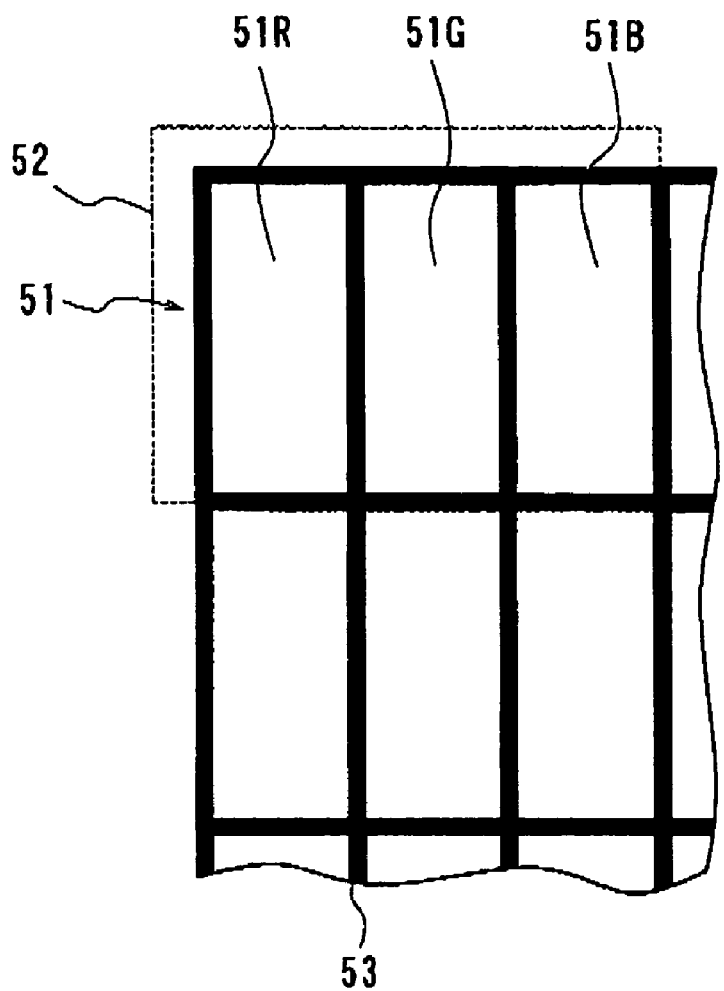
FIG. 19 is a schematic view explaining one embodiment of the color filter used in the known information display panel.
Figure 20:
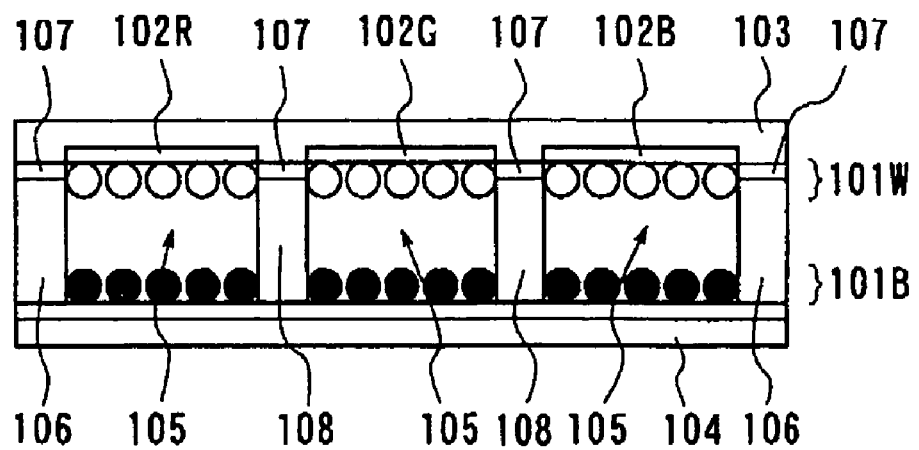
FIG. 20 is a schematic view explaining one embodiment of the known information display panel.

The cell formed by the partition walls each made of rib has a square shape, a triangular shape, a line shape, a circular shape and a hexagon shape, and has an arrangement such as a grid, a honeycomb and a mesh, as shown in FIG. 18 viewed from a plane surface of the substrate. It is preferred that the portion corresponding to a cross section of the partition wall observed from the display side (an area of the frame portion of the display cell) should be made as small as possible, so that sharpness of the image display can be improved.

As the formation method of the partition wall there are a die transferring method, a screen-printing method, a sandblast method, a photolithography method and an additive method. Any methods can be preferably used in the information display panel of this invention. Among them, it is preferred to use a photolithography method using a resist film and a die transferring method.

Then, the liquid powders for example used as the display media in the information display panel according to the present invention will be explained. The applicant has the right of the name of the liquid powders utilized in the information display panel of the present invention as "electric liquid powders (trade mark): registration number 4636931".

In the present invention, a term "liquid powders" means an intermediate material having both of liquid properties and particle properties and exhibiting a self-fluidity without utilizing gas force and liquid force. For example, a liquid crystal is defined as an intermediate phase between a liquid and a solid, and has a fluidity showing a liquid characteristic and an anisotropy (optical property) showing a solid characteristic (Heibonsha Ltd.: encyclopedia). On the other hand, a definition of the particle is a material having a finite mass even if it is vanishingly small and receives an attraction of gravity (Maruzen Co., Ltd.: physics subject-book). Here, even in the particles, there are special states such as gas-solid fluidized body and liquid-solid fluidized body. If a gas is flown from a bottom plate to the particles, an upper force is acted with respect to the particles in response to a gas speed. In this case, the gas-solid fluidized body means a state that is easily fluidized when the upper force is balanced with the gravity. In the same manner, the liquid-solid fluidized body means a state that is fluidized by a liquid. (Heibonsha Ltd.: encyclopedia) In the present invention, it is found that the intermediate material having both of fluid properties and solid properties and exhibiting a self-fluidity without utilizing gas force and liquid force can be produced specifically, and this is defined as the liquid powders.

That is, as is the same as the definition of the liquid crystal (intermediate phase between a liquid and a solid), the liquid powder according to the invention is a material showing the intermediate state having both of liquid properties and particle properties, which is extremely difficult to receive an influence of the gravity showing the particle properties mentioned above and indicates a high fluidity. Such a material can be obtained in an aerosol state i.e. in a dispersion system wherein a solid-like or a liquid-like material is floating in a relatively stable manner as a dispersant in a gas, and thus, in the information display panel according to the invention, a solid material is used as a dispersant.

In the information display panel of the present invention, the liquid powders composed of a solid material stably floating as a dispersant for example in a gas and exhibiting a high fluidity in an aerosol state are sealed between two opposed substrates, at least one substrate being transparent. Such liquid powders are too fluid to measure its repose angle, which is an index indicating fluidity of powders and can be made to move easily and stably by means of Coulomb's force and so on generated by applying a low voltage.

As mentioned above, the liquid powders as the display media for example used in the present invention means an intermediate material having both of liquid properties and particle properties and exhibiting a self-fluidity without utilizing gas force and liquid force. Such liquid powders become particularly an aerosol state. In the information display panel according to the invention, the liquid powders are used in a state such that a solid material is relatively stably floating as a dispersant in a gas.

Then, an example of particles for the display media (hereinafter, sometimes refer to particles) constituting the display media in the information display panel according to the invention will be explained. The particles for the display media are used as the display media constructed by only the particles for the display media, or the display media constructed by mixing them with the other particles, or the display media constructed by controlling them into the liquid powders.

The particles include resin as a main ingredient and, according to need, charge control agent, coloring agent, inorganic additives, as is the same as the known one. Hereinafter, typical examples of resin, charge control agent, coloring agent and other additive will be explained.

Typical examples of the resin include urethane resin, urea resin, acrylic resin, polyester resin, acryl urethane resin, acryl urethane silicone resin, acryl urethane fluorocarbon polymers, acryl fluorocarbon polymers, silicone resin, acryl silicone resin, epoxy resin, polystyrene resin, styrene acrylic resin, polyolefin resin, butyral resin, vinylidene chloride resin, melamine resin, phenolic resin, fluorocarbon polymers, polycarbonate resin, polysulfon resin, polyether resin, and polyamide resin. Two kinds or more of these may be mixed and used. For the purpose of controlling the adherence to the substrate, acryl urethane resin, acryl silicone resin, acryl fluorocarbon polymers, acryl urethane silicone resin, acryl urethane fluorocarbon polymers, fluorocarbon polymers, silicone resin are particularly preferable.

Though charge control agents are not particularly specified to the following examples, examples of the negative charge control agent include salicylic acid metal complex, metal containing azo dye, oil-soluble dye of metal-containing (containing a metal ion or a metal atom), the fourth grade ammonium salt-based compound, calixarene compound, boron-containing compound (benzyl acid boron complex), and nitroimidazole derivative. Examples of the positive charge control agent include nigrosine dye, triphenylmethane compound, the fourth grade ammonium salt-based compound, polyamine resin, imidazole derivatives. Additionally, metal oxides such as ultra-fine particles of silica, ultra-fine particles of titanium oxide, ultra-fine particles of alumina, and so on; nitrogen-containing circular compound such as pyridine, and so on, and these derivates or salts; and resins containing various organic pigments, fluorine, chlorine, nitrogen and the like can be employed as the charge control agent.

As for a coloring agent, various kinds of organic or inorganic pigments or dye with various colors as described below are usable.

Examples of black pigments include carbon black, copper oxide, manganese dioxide, aniline black, activate carbon and the like.

Examples of blue pigments include C.I. pigment blue 15:3, C.I. pigment blue 15, Berlin blue, cobalt blue, alkali blue lake, Victoria blue lake, phthalocyanine blue, metal-free phthalocyanine blue, partially chlorinated phthalocyanine blue, first sky blue, Indanthrene blue BC and the like.

Examples of red pigments include red oxide, cadmium red, diachylon, mercury sulfide, cadmium, permanent red 4R, lithol red, pyrazolone red, watching red, calcium salt, lake red D, brilliant carmine 6B, eosin lake, rhodamine lake B, alizarin lake, brilliant carmine 3B, C.I. pigment red 2 and the like.

Examples of yellow pigments include chrome yellow, zinc chromate, cadmium yellow, yellow iron oxide, mineral first yellow, nickel titanium yellow, navel orange yellow, naphthol yellow S, hansa yellow G, hansa yellow 10G, benzidine yellow G, benzidine yellow GR, quinoline yellow lake, permanent yellow NCG, tartrazinelake, C.I. pigment yellow 12 and the like.

Examples of green pigments include chrome green, chromium oxide, pigment green B, C.I. pigment green 7, Malachite green lake, final yellow green G and the like.

Examples of orange pigments include red chrome yellow, molybdenum orange, permanent orange GTR, pyrazolone orange, Balkan orange, Indanthrene brilliant orange RK, benzidine orange G, Indanthrene brilliant orange GK, C.I. pigment orange 31 and the like.

Examples of purple pigments include manganese purple, first violet B, methyl violet lake and the like.

Examples of white pigments include zinc oxide, titanium oxide, antimony white, zinc sulphide and the like.

Examples of extenders include baryta powder, barium carbonate, clay, silica, white carbon, talc, alumina white and the like. Furthermore, there are Nigrosine, Methylene Blue, rose bengal, quinoline yellow, and ultramarine blue as various dyes such as basic dye, acidic dye, dispersion dye, direct dye, etc.

Examples of inorganic additives include titanium oxide, zinc oxide, zinc sulphide, antimony oxide, calcium carbonate, pearl white, talc, silica, calcium silicate, alumina white, cadmium yellow, cadmium red, cadmium orange, titanium yellow, Berlin blue, Armenian blue, cobalt blue, cobalt green, cobalt violet, ion oxide, carbon black, manganese ferrite black, cobalt ferrite black, copper powder, aluminum powder and the like.

Inorganic additives among these coloring agents may be used alone or in combination with two or more kinds thereof. Particularly, carbon black is preferable as the black coloring agent, and titanium oxide is preferable as the white coloring agent.

The above-mentioned color agents are composed to obtain a certain color of particles for display media.

Moreover, it is preferable to use particles for display media (hereinafter, sometimes refer to particles) of the present invention, whose average particle diameter d(0.5) ranges between 1 to 20 μm and which are even. If the average particle diameter d(0.5) exceeds this range, the image sharpness is sometimes deteriorated, and, if the average particle diameter is smaller than this range, an agglutination force between the particles becomes too large to prevent the movement of the particles.

Further, in the present invention as for the particle diameter distribution, the particle diameter distribution Span, which is defined by the following formula, is less than 5 preferably less than 3:

$$Span=(d(0.9)-d(0.1))/d(0.5)$$

(here, d(0.5) means a value of the particle diameter expressed by μm wherein an amount of the particles having the particle size larger than or smaller than this value is 50%, d(0.1) means a value of the particle diameter expressed by μm wherein an amount of the particles having the particle size smaller than this value is 10%, and d(0.9) means a value of the particle size expressed by μm wherein an amount of the particles having the particle size smaller than this value is 90%).

When the Span is set to no more than 5, each particle has similar particle diameter to perform an even particle movement.

Furthermore, as for a correlation between each particles, it is crucial to set a ratio of d(0.5) of the particles having smallest diameter with respect to d(0.5) of the particles having largest diameter to not more than 50 preferably not more than 10. Even if the particle diameter distribution Span is made smaller, the particles having different charge properties with each other are moved in the opposite direction. Therefore, it is preferred that the particle diameters are formed closely with each other and equivalent amounts of the particles are easily moved in the opposite direction. To this end, the above range is obtained.

Here, the particle diameter distribution and the particle diameter mentioned above can be measured by means of a laser diffraction/scattering method. When a laser light is incident upon the particles to be measured, a light intensity distribution pattern due to a diffraction/scattering light occurs spatially. This light intensity distribution pattern corresponds to the particle diameter, and thus it is possible to measure the particle diameter and the particle diameter distribution.

In the present invention, the particle diameter and the particle diameter distribution are obtained by a volume standard distribution. Specifically, the particle diameter and the particle diameter distribution can be measured by means of a measuring apparatus Mastersizer 2000 (Malvern Instruments Ltd.) wherein the particles setting in a nitrogen gas flow are calculated by an installed analysis software (which is based on a volume standard distribution due to Mie's theory).

A charge amount of the particle for display media properly depends upon the measuring condition. However, it has been found that the charge amount of the particle for display media in the information display panel substantially depends upon an initial charge amount, a contact with respect to the partition walls, a contact with respect to the substrates, a charge decay due to an elapsed time, and specifically a saturation value of the particles for the display media during a charge behavior is a main factor.

After various investigations by the inventors, it is found that an adequate range of the charged values of the particles for display media can be estimated by performing a blow-off method utilizing the same carrier particles so as to measure the charge amount of the particles for display media.

Further, when the display media driven in a gaseous space are applied to the dry type information display panel, it is important to control a gas surrounding the display media in a gap between the substrates, and a suitable gas control contributes an improvement of display stability. Specifically, it is important to set the relative humidity of the gas in the gap not more than 60% RH at 25° C., preferably not more than 50% RH.

The above gap means a gas portion surrounding the display media obtained by substituting occupied portions of the electrodes 5, 6 (in the case of arranging the electrodes inside the substrates), the display media 3, the partition walls 4 (in the case of arranging the partition wall), the color filter 27 (in the case of arranging the color filter inside the substrate) and a seal portion of the information display panel from the space between the opposed substrates 1 and 2 shown in FIGS. 1*a* and 1*b* to 9.

A kind of the gap gas is not limited as long as it has the humidity mentioned above, but it is preferred to use dry air, dry nitrogen gas, dry argon gas, dry helium gas, dry carbon dioxide gas, dry methane gas and so on. It is necessary to seal this gas in the information display panel so as to maintain the humidity mentioned above. For example, it is important to perform the operations of filling the display media and assembling the information display panel under an atmosphere having a predetermined humidity and to apply a seal member and a seal method for preventing a humidity inclusion from outside.

In the information display panel of the invention, a gap between the substrates may be adjusted so that the display media can be moved to maintain the contrast. The gap is adjusted normally to 10-500 μm, preferably 10-200 μm.

The volume occupied rate of the display media in an aerial space between the opposed substrates is preferably 5-70%, more preferably 5-60%. If the volume occupied rate of the display media exceeds 70%, the display media may become difficult to move, and if it is less than 5%, a sufficient contrast cannot be obtained and a sharp image display is not performed.

The information display panel according to the invention is preferably applicable to the display unit for mobile equipment such as notebook personal computers, PDAs, cellular phones, handy terminals and so on; to the electric paper such as electric books, electric newspapers, electric manual (instruction) and so on; to the bulletin boards such as signboards, posters, blackboards and so on; to the image display unit for electric calculator, home electric application products, auto supplies and so on; to the card display unit such as point cards, IC cards and so on; and to the display unit for electric advertisements, electric POPS, electric price tags, electric shelf tags, electric musical score, RF-ID device and so on. In addition, the information display panel according to the invention is preferably used as an information display panel, wherein display is rewritten by means of external electric field forming means, i.e. a rewritable paper.

As a driving method of the information display panel according to the invention, there are various types of drive systems such as passive matrix drive system and static drive system, by which a panel itself doesn't have switching elements, active matrix system, by which a panel has three-terminal switching elements represented by a thin-film transistor (TFT) or two-terminal switching elements represented by a thin-film diode (TFD), and external electric field drive system using external electric field forming means.

What is claimed is:

1. An information display panel, in which at least one group of display media having optical reflectance and charge characteristics, formed by at least one group of particles, are sealed in a cell (corresponding to one display unit) formed by transparent partition walls between two substrates, at least one substrate being transparent, and, in which the display media, to which an electrostatic field is applied, are made to move so as to display information such as an image, comprising a color filter formed by arranging filters having a predetermined number of colors on a transparent substrate at a display side so as to perform a color display, and a black layer arranged between the transparent partition walls and the transparent substrate.

2. The information display panel according to claim 1, wherein the color filter is constructed by aligning the filters having three primary colors respectively, and one display unit is constructed by one color filter having three primary colors.

3. The information display panel according to claim 1, wherein the color filter is constructed by aligning the filters having three primary colors respectively, and one display unit is constructed by one color filter having three primary colors and a transparent filter.

4. The information display panel according to claim 2, wherein, as the filter having three primary colors, use is made of red (R), green (G) and blue (B) filters.

5. The information display panel according to claim 2, wherein, as the filter having three primary colors, use is made of cyan (C), magenta (M) and yellow (Y) filters.

6. The information display panel according to claim 1, wherein the at least one group of display media having optical reflectance and charge characteristics, formed by at least one group of particles are two groups of display media such as white color display media and black color display media.

7. An information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as a color image, comprising transparent color filters having three primary colors respectively arranged to one cell, and a colorless transparent clear portion arranged to the respective transparent color filters,
wherein a width of the clear portion is 0.1%-200% of an average particle diameter of the particles constituting the display media.

8. An information display panel, in which at least one group of display media having optical reflectance and charge characteristics, formed by at least one group of particles, are sealed in a cell (corresponding to one display unit) formed by partition walls between two substrates, at least one substrate being transparent, and, in which the display media, to which an electrostatic field is applied, are made to move so as to display information such as a color image, comprising transparent color filters having three primary colors respectively arranged to three pixels formed by dividing respective display units by means of partition walls, and a colorless transparent clear portion arranged to the respective transparent color filters,
wherein a width of the clear portion is 0.1%-200% of an average particle diameter of the particles constituting the display media.

9. The information display panel according to claim 7, wherein the clear portion is formed by one of hole, slit, crossed line, line stripe and circular stripe.

10. The information display panel according to claim 7, wherein a sum of areas of the clear portions Sk is $0.01 < Sk/S < 0.8$ with respect to a total area S of the display region.

11. The information display panel according to claim 3, wherein, as the filter having three primary colors, use is made of red (R), green (G) and blue (B) filters.

12. The information display panel according to claim 3, wherein, as the filter having three primary colors, use is made of cyan (C), magenta (M) and yellow (Y) filters.

13. The information display panel according to claim 2, wherein the at least one group of display media having optical reflectance and charge characteristics, formed by at least one group of particles are two groups of display media such as white color display media and black color display media.

14. The information display panel according to claim 3, wherein the at least one group of display media having optical reflectance and charge characteristics, formed by at least one group of particles are two groups of display media such as white color display media and black color display media.

15. The information display panel according to claim 4, wherein the at least one group of display media having optical reflectance and charge characteristics, formed by at least one group of particles are two groups of display media such as white color display media and black color display media.

16. The information display panel according to claim 5, wherein the at least one group of display media having optical reflectance and charge characteristics, formed by at least one group of particles are two groups of display media such as white color display media and black color display media.

17. The information display panel according to claim 8, wherein the clear portion is formed by one of hole, slit, crossed line, line stripe and circular stripe.

18. The information display panel according to claim 8, wherein a sum of areas of the clear portions Sk is $0.01 < Sk/S < 0.8$ with respect to a total area S of the display region.

19. The information display panel according to claim 9, wherein a sum of areas of the clear portions Sk is $0.01 < Sk/S < 0.8$ with respect to a total area S of the display region.

* * * * *